No. 663,733. Patented Dec. 11, 1900.
C. E. CRANE.
MILK BOTTLE.
(Application filed June 2, 1899.)
(No Model.)
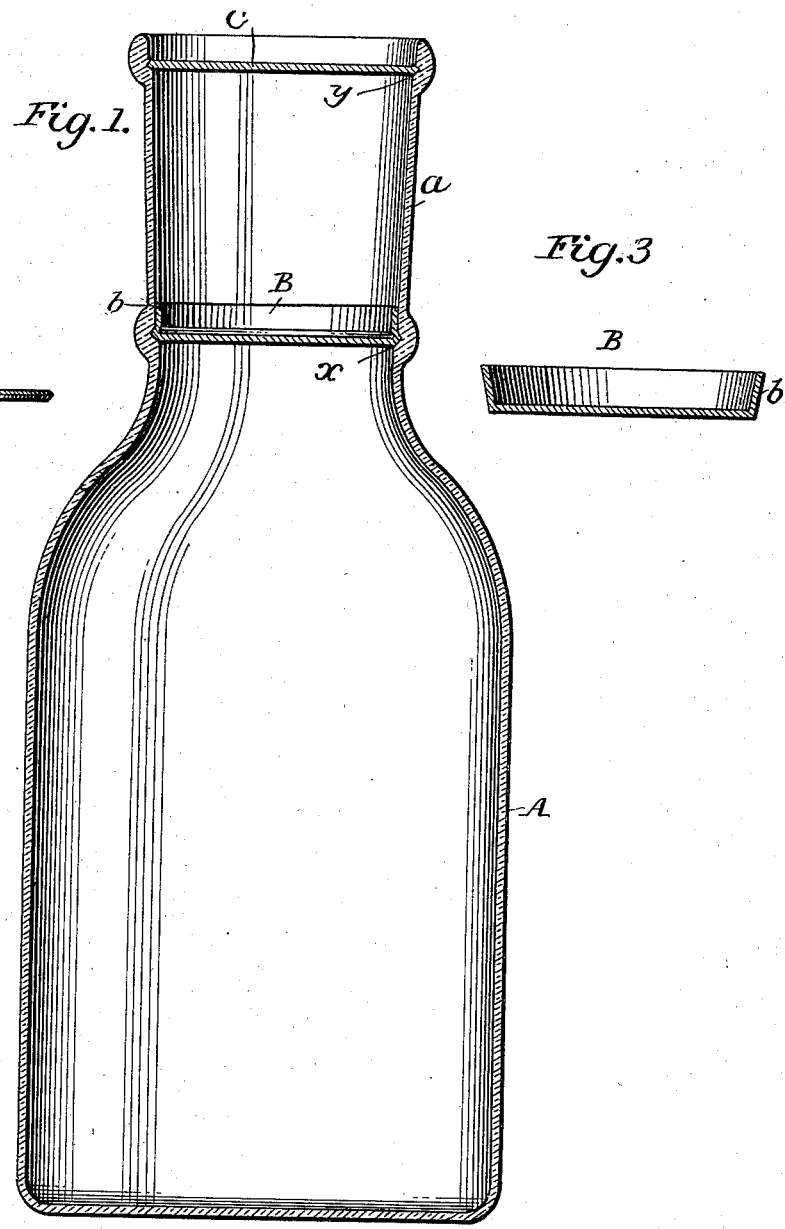

United States Patent Office.

CHARLES EUGENE CRANE, OF SEATTLE, WASHINGTON.

MILK-BOTTLE.

SPECIFICATION forming part of Letters Patent No. 663,733, dated December 11, 1900.

Application filed June 2, 1899. Serial No. 719,099. (No model.)

*To all whom it may concern:*

Be it known that I, CHARLES EUGENE CRANE, a citizen of the United States, residing at Seattle, in the county of King and State of Washington, have invented certain new and useful Improvements in Milk-Bottles, of which the following is a specification.

My invention is a combined milk and cream receptacle constructed as fully set forth hereinafter and illustrated in the accompanying drawings, in which—

Figure 1 is a sectional elevation of a receptacle embodying my improvement; Fig. 2, an edge view of the upper detachable disk; Fig. 3, a section of the lower disk, having an edge flange.

The body A of the receptacle is made of any suitable material and in any desired form and proportions. Preferably it is of glass, tapering toward the upper end, which is extended to form an elongated neck $a$, the latter preferably tapering slightly from the upper end or mouth to the point where it meets the body portion. Within the neck $a$ and near the lower end of the same is an annular shoulder $x$, and in some cases there is an additional shoulder $y$ near the upper part of the neck and within the same. To the shoulder or seat $x$ is adapted a disk B, of any suitable flexible material, which when forced into place will form a seal or joint with the inside of the neck, and this disk is provided with a flange $b$ of any desired depth.

The disk B may be of paper suitably stiffened and waterproofed, or it may be of celluloid, prepared gelatin, or any other suitable material and sufficiently flexible to form a tight joint with the interior of the neck when forced into its place on the seat and capable of resisting the action of any liquid which is placed in the neck above the disk.

The body A of the receptacle is supplied with milk, as usual. The disk B is then inserted in the neck and forced onto its seat and then cream is poured into the neck above the disk, where it remains separated from the milk in the body of the receptacle.

After the cream is poured from the receptacle formed by the neck and the disk B the latter may be removed by means of a corkscrew or any harpoon-like instrument, after which the milk may be also removed.

In order to protect the cream when the receptacle has to stand for any length of time after being filled, a second disk C may be inserted in the mouth until it rests on the shoulder or seat $y$.

Without limiting myself to a receptacle of any special material or form or proportions or to the use of a disk of any special material, I claim as my invention—

A combined cream and milk receptacle, comprising the body portion A, for containing milk, an extended neck portion $a$, for containing cream, the latter tapering from its upper end downwardly to its junction with the body portion and provided with an interior annular shoulder $x$ near said junction, a flexible flanged disk B to seat on said shoulder and form a liquid-tight partition between the body and neck, and a removable disk-closure for the upper end of the neck, substantially as and for the purpose specified.

In testimony whereof I have signed my name to this specification in the presence of two subscribing witnesses.

CHARLES EUGENE CRANE.

Witnesses:
 GEO. E. TASKETT,
 EDWARD C. KELLOGG.